United States Patent Office 3,333,187
Patented July 25, 1967

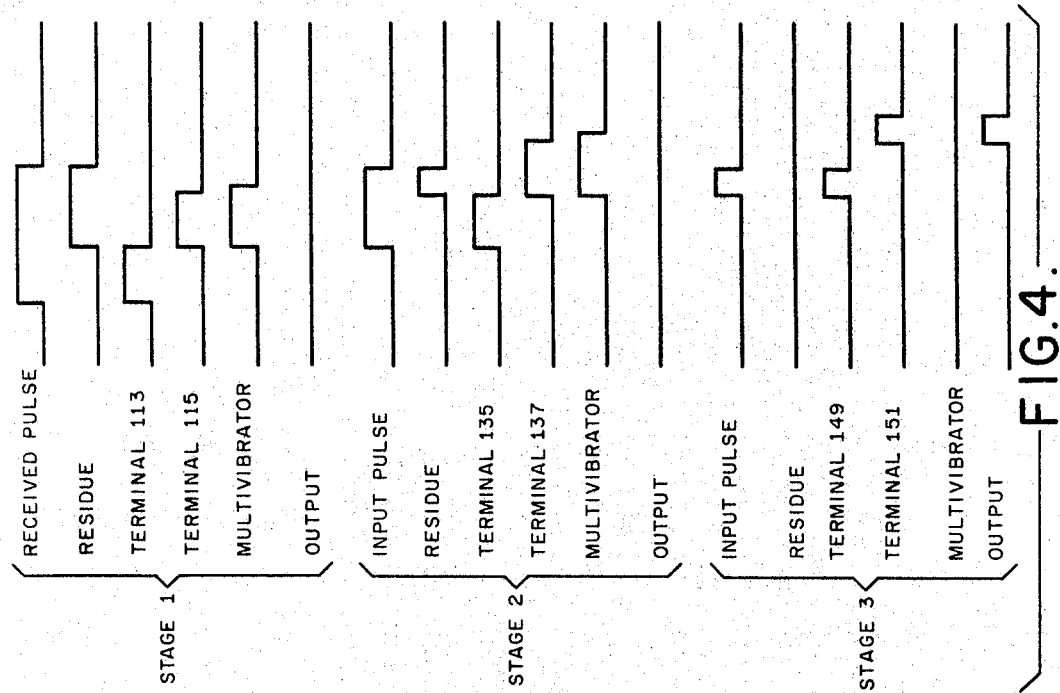
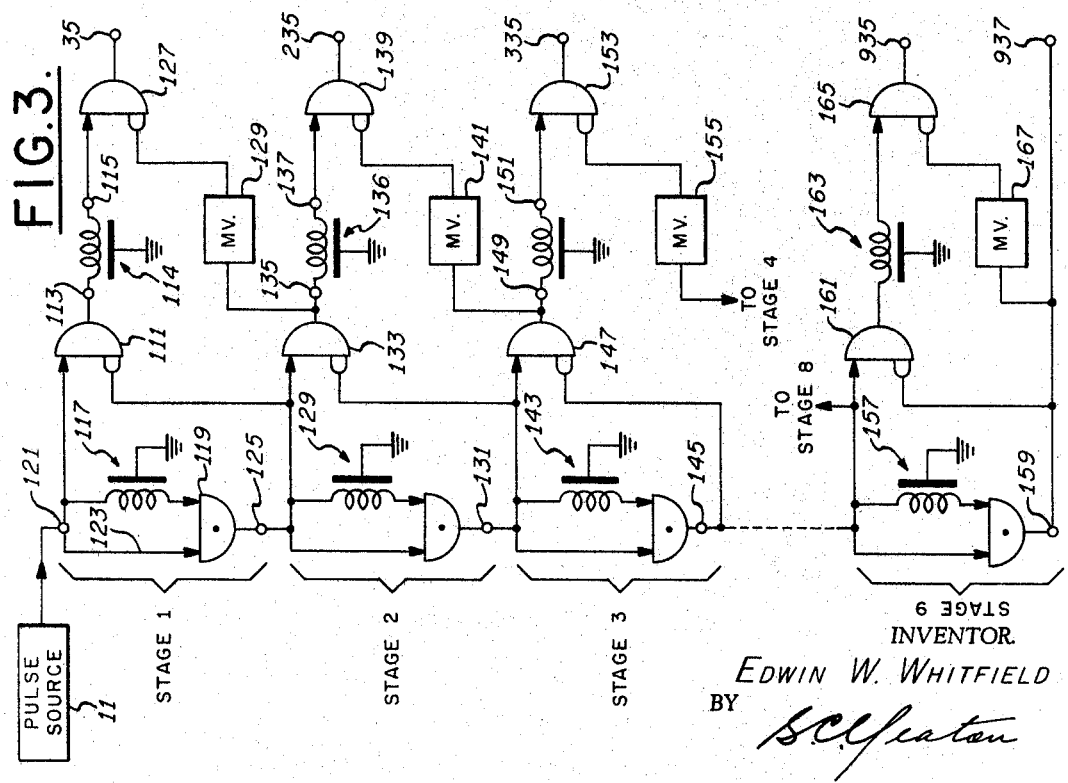

3,333,187
PULSE DURATION MEASURING DEVICE USING SERIES CONNECTED PULSE WIDTH CLASSIFIER STAGES
Edwin W. Whitfield, Great Neck, N.Y., assignor to Sperry Rand Corporation, Great Neck, N.Y., a corporation of Delaware
Filed Mar. 25, 1964, Ser. No. 354,603
4 Claims. (Cl. 324—68)

The invention relates to electrical pulse measuring circuits and more particularly to electrical pulse duration measuring circuits.

Prior art methods for measuring pulse duration have been devised in which the unknown pulse and precisely regulated clock pulses are applied to an AND gate. The output of the gate is applied to a counter. The reading of this counter can be used as an indication of the unknown pulse duration. This technique, however, is complicated since the accuracy of the method depends upon the calibration of the clock pulse source. This source must be calibrated frequently in order to maintain a high degree of stability.

Another prior art method for measuring pulse duration employs a number of delay line discriminators in which each line accepts only pulses of a given width. This system becomes impractical except in those cases in which a relatively few number of pulse widths are to be accommodated, since each pulse width to be measured requires a separate line and discriminator.

It is an object of the present invention to provide a pulse duration measuring device having a minimum number of components.

It is another object of the invention to provide a pulse measuring device having a high degree of stability.

It is still another object of the present invention to provide a pulse duration measuring device whose accuracy depends almost entirely on passive circuit elements.

These and other objects are achieved according to the principles of the present invention by providing means for shortening the unknown pulse duration by successive known decrements until the residue of the pulse is less than a known decrement and by then indicating the number of decrements by which the pulse duration has been shortened.

The principles of the invention will be explained in detail in connection with the accompanying drawings in which:

FIG. 3 is a block diagram illustrating a second type of pulse duration classifier stage that may be used in practicing the invention, and FIG. 4 is a graph of voltage wave shapes useful in explaining the operation of the circuit of FIG. 3.

Figure 1:
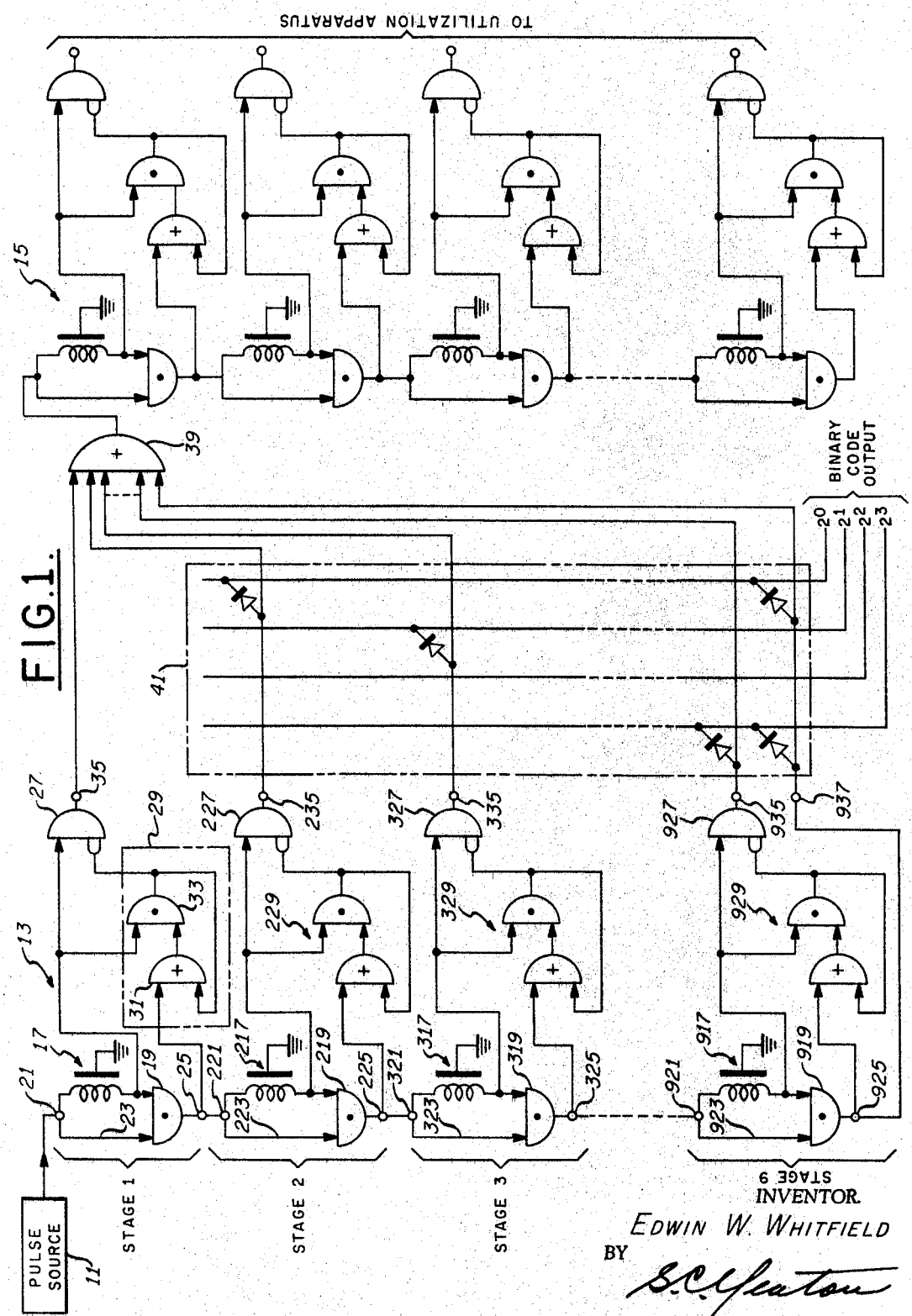
FIG. 1 is a block diagram of a presently preferred embodiment of the invention.

Referring now to FIG. 1, a pulse duration measuring circuit contains a number of pulse duration classifier stages. Each stage functions to provide an output signal if the duration of the pulses to be measured falls within certain limits established for that stage.

The pulses which are to be measured may emanate from any source shown functionally as a pulse source 11 in FIG. 1.

Stage 1, which is typical of the various stages in the measuring device, contains a delay line 17 whose output is applied to an AND gate 19. The received pulse is also applied directly to the AND gate 19 from the input terminal 21 through a line 23. The directly received pulse cannot pass through the gate 19 until the delayed pulse arrives at the gate. The delay line 17, the direct line 23, and the AND gate 19 thus act as a threshold circuit to permit only that portion of a received pulse to pass which persists longer than the delay time of the delay line 17. Effectively, then, the threshold circuit subtracts a predetermined portion from the leading edge of the received pulses. The residue of the pulse from gate 19 is applied to a residue terminal 25.

The output of the delay line 17 is also applied to a signal input terminal of an inhibitor gate 27. The signal at the terminal 25 is applied to a regenerative broadening circuit 29. Such a circuit is described on page 409 of "Pulse and Digital Circuits" written by Millman and Taub and published by McGraw-Hill, New York, in 1956.

The circuit 29 contains an OR gate 31 and an AND gate 33. A second input signal to the circuit 29 is derived from the output of the delay line 17. The operation of the regenerative broadening circuit is described fully in the Millman and Taub textbook. Briefly, however, this circuit functions to provide an output pulse starting at the instant that both a residue pulse and a delayed pulse are applied to its input terminals and terminating simultaneously with the delayed pulse.

The output of circuit 29 is applied to the inhibit terminal of the gate 27. The output of the gate 27 is applied to a signal output terminal 35.

The residue pulse from the terminal 25 is applied directly to the input terminal 221 of stage 2. The pulses received at the input terminal of stage 2 are passed through a delay line 217 and a direct line 223 to an AND gate 219. The delayed pulses in this stage pass through an inhibit gate 227 to a signal output terminal 235 unless they are blocked by an inhibit pulse from the regenerative broadening circuit 229.

Any residue appearing at the residue terminal 225 is applied to the input terminal 321 of stage 3. This received signal then passes through a delay line 317 and a direct line 323 to an AND gate 319.

Any residue from the threshold circuit of stage 3 is applied to the residue terminal and then to the succeeding stages as well as the regenerative broadening circuit 329.

The delayed pulse from the delay line 317 is applied to a signal output terminal 335 through an inhibit gate 327 unless blocked by an inhibit pulse from the circuit 329.

The final stage in the bank 13, represented as stage 9 in FIG. 1, receives any residue pulse from the preceding stage at its input terminal 921. The received pulse is passed through a delay line 917 and a direct line 923 to an AND gate 919. Any residue from the gate 919 is passed to the residue terminal 925 and then to the regenerative broadening circuit 929. Pulses from the delay line 917 are passed to the signal output terminal 935 through an inhibit gate 927 unless blocked by pulses from the circuit 929. Any residue pulse from the final stage is also applied to a terminal 937.

The various signal output terminals of the stages in the bank 13 are applied to an OR gate 39. The signal output terminal at which an output pulse appears in response to an input pulse from the source 11 may be indicated in any convenient manner. As presently preferred, a conventional decimal to binary conversion matrix 41 may be used to supply a binary coded output to any suitable storage means.

The output of the OR gate 39 is applied to the second bank of pulse duration classifier stages 15. The arrangement of this bank is identical to that of the bank 13 except that the delay lines in the first bank are arranged to provide a different delay time than those in the second bank. The reason for this will become apparent as the discussion proceeds.

Bank 15 normally contains the same number of stages as the bank 13 and normally is used to actuate the same kind of output signal indicating means as that used for the bank 13. Thus, a matrix similar to the matrix converter 41 might be used with the bank 15.

The resolution of a given bank is determined by the delay afforded by the delay lines of each stage in the bank. Thus if each stage in a given bank contains a delay line with a 1 microsecond delay, that bank would have a resolution of 1 microsecond.

The range of a given bank is determined by the number of stages in that bank.

For example, if the stages of the bank 13 each contain 1 microsecond delay lines and there are nine stages in the bank, the bank will have a resolution of 1 microsecond and a range of 10 microseconds. Pulses having a duration between 0 and 1 microsecond would appear at the signal output terminal 35, pulses having a duration between 1+ and 2 microseconds would appear at the output terminal 235, and so forth. Pulses having a duration between 9+ and 10 microseconds would appear at the output terminal 937.

The succeeding banks of classifier stages ordinarily contain delay lines providing one tenth the resolution of the delay lines in the preceding bank. In this way, a decimal indication of a pulse duration may be obtained. Thus, if the bank 13 contains 1 microsecond delay lines and the bank 15 contains 0.1 microsecond delay lines, pulses having a duration between 0.1 and 10 microseconds may be measured in 0.1 microsecond intervals.

Figure 2:
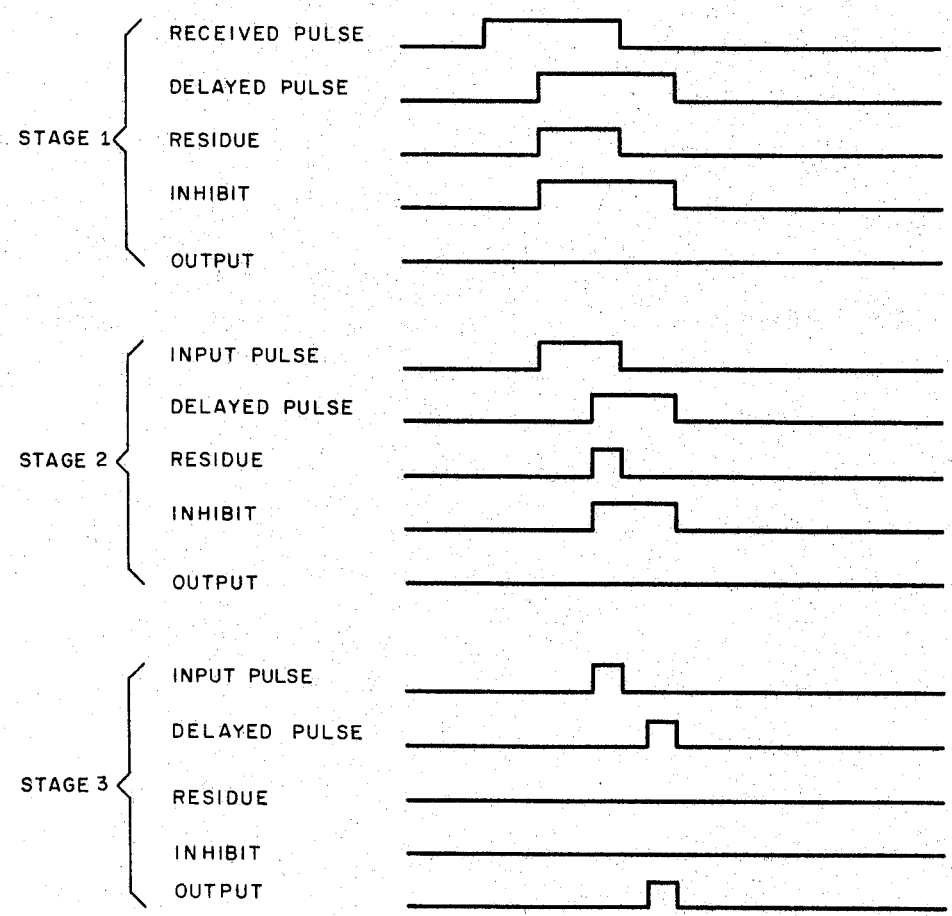
FIG. 2 is a graph of voltage wave shapes useful in explaining the operation of the circuit of FIG. 1.

The operation of the device may be understood by referring to FIGS. 1 and 2. Assume that 1 microsecond and 0.1 microsecond delay lines are used in the banks 13 and 15 respectively.

If a pulse having a duration of 2.5 microseconds is applied to the input terminal of stage 1, this pulse will flow directly to the gate 19 through the line 23. This pulse will also flow to the gate 19 through the delay line 17. Since the gate 19 will pass a pulse only when both of its input terminals are energized, this gate will produce no residue for the first microsecond. At this time, however, the delayed pulse will arrive at the gate and produce a residue which will persist until the termination of the direct pulse. Thus, the threshold circuit has produced a residue pulse which is precisely 1 microsecond shorter than the received pulse.

The delayed pulse passes to the inhibit gate 27 at the same time that the residue pulse passes to the circuit 29. The circuit 29 produces an inhibit pulse which continues to flow all during the time that the delayed pulse is applied to the gate 27. Thus the delayed pulse is prevented from passing through the gate 27, and no output signal appears at the signal output terminal 35.

The residue pulse from the first stage is also passed to the input terminal 221 of stage 2. This pulse passes directly to the AND gate 219 and also to this gate through the delay line 217. The gate 219 produces a residue pulse only during the time that both the input pulse and the delayed pulse are applied to its input terminals. Since the delayed pulse reaches the AND gate 219 precisely 1 microsecond after the direct pulse reaches that gate, the residue pulse is 1 microsecond shorter than the input pulse to stage 2. The residue pulse appearing at the terminal 225 actuates the regenerative broadening circuit 229 thus inhibiting the flow of the delayed pulse through the gate 227. The inhibiting pulse from the circuit 229 persists until the end of the delayed pulse. Thus no output pulse appears at the signal output terminal 235.

The residue pulse which has been shortened by two 1 microsecond decrements now has a duration of 0.5 microsecond. This pulse is applied to the input terminal 321 of stage 3. The pulse flows directly to the AND gate 319 through the line 323 and also to the AND gate through the delay line 317. Since the pulse flowing through the line 317 is delayed 1 microsecond, this pulse does not arrive at the gate until after the termination of the directly received pulse. The gate 319 can produce no residue under these circumstances since no portion of the two pulses coincide.

Since there is no residue pulse under these conditions, the delayed pulse can pass directly from the line 317, through the inhibit gate 327, and to the signal output terminal 335.

This pulse can pass through the diode in the matrix 41 and energize the $2^1$ binary code output terminal so as to indicate that the unknown pulse had a duration of greater than two but less than three microseconds.

The output pulse from the terminal 335 also passes to the OR gate 39 and then on to the bank 15.

This pulse, it will be remembered, has a duration of 0.5 microsecond. When introduced into the bank 15, the pulse will pass through the various threshold circuits in the bank and be shortened by 0.1 microsecond for each threshold circuit it traverses.

A residue of this pulse will appear sequentially at the residue output of the first four stages in the bank. These residues will block the flow of an output signal from the signal output terminals in any of these stages. When the residue of the pulse reaches the fifth stage, however, it will have a duration of 0.1 microsecond. This pulse cannot pass through the AND gate of the fifth threshold circuit, therefore no inhibit signal will be produced by this stage. This will allow an output pulse to appear at the signal output terminal of the fifth stage thus indicating that a 0.5 microsecond pulse had been applied to the bank 15.

If a 0.5 microsecond pulse had been originally introduced from the source 11, this pulse could not have passed through the AND gate 19 so that there would have been no inhibit signal in stage 1 of bank 13. The 0.5 microsecond pulse would have appeared at the signal output terminal 35. Since the output line from this terminal is not connected to the matrix 41, there would have been no binary coded output signal from this matrix. The 0.5 microsecond pulse would have passed through the gate 39 to the bank 15 where it would have again provided an output signal from the fifth stage.

Although the pulse duration classifier stages illustrated in FIG. 1 represent the presently preferred embodiment of the invention, modifications of the basic circuit are possible. FIG. 3, for instance, illustrates an alternative embodiment of a bank of pulse duration classifier stages. These may be used in the circuit of FIG. 1 if desired.

In the circuit of FIG. 3, pulses from a source 11 are applied to the input terminal 121 of stage 1. These received pulses are applied directly to an AND gate 119 through the line 123 and through the delay line 117. These two lines together with the AND gate represent a threshold circuit identical to that employed in the circuits of FIG. 1. Any output of the gate 119 appears at the residue terminal 125. The residue terminal is connected to the inhibit terminal of a first inhibit gate 111. The output of this gate is applied to the input terminal 113 of a compensating delay line 114. This delay line is designed to provide a time delay equal to that provided by the delay line 117 in the associated threshold circuit. The output terminal 115 of the delay line is connected to the input terminal of a second inhibit gate 127, and the output of this gate is connected to a signal output terminal 35.

A monostable multivibrator 129 is connected to the inhibit terminal of the gate 127. This multivibrator is designed to have a quasi-stable pulse duration slightly longer than the delay time of the delay lines in the same classifier stage.

Stage 2 is similar to stage 1. Pulses are received in a threshold circuit 129 and any residue from this threshold circuit appears at a residue terminal 131. The input pulse to the threshold circuit 129 is also applied to a first inhibit gate 133 of stage 2. The output of the gate 133 is used to trigger the multivibrator 129 and is also applied to the input terminal 135 of a compensating delay line. The output terminal 137 of this delay line is applied to a second inhibit gate 139. The output of this gate is applied to the signal output terminal 235.

Any residue pulse from the terminal 131 is applied to the inhibit terminal of the gate 133. The output of a multivibrator 141 is applied to the inhibit terminal of the gate 139. The multivibrator 141 is designed to have the same quasi-stable pulse duration as the multivibrator 129.

Stage 3 is also similar to stage 1. Pulses are received in a threshold circuit 143 which provides residue signals at the terminal 145. These signals are in turn applied to the inhibit terminal of a first inhibit gate 147. The input signal to this stage is applied to the inhibit terminal of the gate 133 in the previous stage as well as to the gate 147. The output of this gate is connected to the input terminal 149 of a compensating delay line. The output terminal of the first delay line is connected to the second inhibit gate 153 and then to the signal output terminal 335. The multivibrator 155 is triggered by a pulse from the succeeding stage.

The final stage 9 contains a threshold circuit 157. Any residue from this circuit appears at the residue terminal 159. Input pulses to the stage 9 are applied to the first inhibit gate of the previous stage as well as to the inhibit gate 161. A residue from the circuit 157 is applied to the inhibit terminal of the gate 161. The output of the gate 161 is applied to the compensating delay line 163 and then to the second inhibit gate 165. The output of this gate is applied to the signal output terminal 935. The residue of the threshold circuit 157 is applied not only to the gate 161, but also to the input of the multivibrator 167 and the output terminal 937.

The delay line in a given threshold circuit and the compensating delay line in the same stage are designed to provide equal delays. In a typical circuit, each threshold circuit in the bank is designed to provide equal decrements by employing equal valued delay lines in that bank. Each multivibrator is designed to provide quasi-stable pulses having durations slightly longer than the delay provided by the delay lines. Thus in a typical circuit having 1 microsecond delay lines, 1.1 microseconds multivibrators would be appropriate.

The bank of pulse duration classifier stages of FIG. 3 may be substituted for the corresponding bank of FIG. 1 by connecting the signal output terminals 35, 235, 335, 935, and 937 to the corresponding points in the circuit of FIG. 1.

The operation of the circuit of FIG. 3 can be understood by assuming that the various delay lines each provide a 1 microsecond delay and considering the circuit functions when a 2.5 microseconds pulse is applied from the source 11. The circuit of FIG. 3 and the voltage wave shapes of FIG. 4 illustrate the operation under these conditions.

When the pulse is received at the input terminal 121 it passes into the threshold circuit of stage 1, leaving a residue which is 1 microsecond shorter than the received pulse. When the pulse is received at the terminal 121 it also passes through the gate 111 and appears at the input terminal 113 of the compensating delay line 114. This delay line provides a pulse at its output terminal 115 which begins 1 microsecond later than the original received pulse. After the pulse has been flowing through the gate 111 for 1 microsecond, it is blocked by the residue from the gate 119. The residue also passes through the gate 133 and actuates the multivibrator 129. The output of the multivibrator blocks the flow of the pules from the terminal 115 through the gate 127 so that no signal appears at the signal output terminal 35.

When the residue pulse appeared at the output of stage 1, it was also applied to the threshold circuit of stage 2. In passing through this second threshold circuit the input pulse is again shortened by 1 microsecond leaving a 0.5 microsecond pulse terminating simultaneously with the input pulse to stage 2. The input pulse to this stage is also passed through the gate 133 until it is inhibited by the residue from the terminal 131. The pulse from the gate 133 is then delayed by the compensating delay line so that it reaches the terminal 137 1 microsecond after the beginning of the input pulse applied to stage 2.

The residue from the terminal 131 passes through the gate 147, actuating the multivibrator 141 and inhibiting any flow through the gate 139. This prevents an output signal from appearing at the terminal 235.

The input pulse from the terminal 131 is now 0.5 microsecond in duration. This pulse cannot pass through the threshold circuit so as to produce a residue. Therefore, the entire pulse received at this stage can pass through the gates 147 and 153 so as to appear as an output pulse at the terminal 335. This indicates that the pulse from the source 11 was between 2 and 3 microseconds in duration. The residue, being 0.5 microsecond in duration, can be applied to a second bank, such as bank 15 of FIG. 1 if desired. This will permit classification of the residue within 0.1 microsecond resolution.

If the pulse from the source 11 had a duration less than 1 microsecond, this pulse would have passed through the gates 111 and 127 to appear as an output at the terminal 35. Since the received pulse in this case would be too short to pass through the threshold circuit in the first stage, there would be no residue pulse to inhibit the flow to the terminal 35.

On the other hand, if the received pulse had a duration of 9.5 microseconds, this pulse would have produced a residue at each threshold circuit in the bank. Thus, no output signals would have been produced at the signal output terminals 35 through 935. The residue at the residue terminal 159, however, would appear at the signal output terminal 937. This residue would again have a duration of 0.5 microsecond. It could be applied to a second bank and again measured to a resolution of 0.1 microsecond.

Although the circuits were described for actually measuring pulse duration, it will be appreciated that the principles of the invention can be used to sort or classify pulses into various categories according to their durations. Using just the circuit of FIG. 3, for instance, incoming pulses will cause signals to appear at the various signal output terminals 35 through 937 according to their duration. These signals can be applied to any suitable utilization circuit. The circuit of FIG. 3, as shown, or a corresponding circuit using the type of stages illustrated in FIG. 1 thus constitutes a pulse duration classifier circuit.

The foregoing discussion has been limited to banks of nine classifier stages. This provides a convenient binary coded decimal readout. It will be appreciated, however, that banks of any number of stages may be employed for other readout systems.

Furthermore, any convenient number of banks may be used in order to provide measurements within any desired range. Thus, for example, banks having a resolution of 10 and 100 microseconds might be placed ahead of the bank 13. Similarly, banks having resolution times less than 0.1 microsecond might be placed beyond the bank 15.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A pulse duration classifier comprising a plurality of identical classifier stages, each stage including means to delay an incoming pulse to be classified; means to detect coincidence between any portions of the incoming and the delayed pulses; means in said coincidence detection means to produce a residue pulse throughout any period of coincidence; a signal output terminal; means to pass the delayed pulses to the output terminal unless the detection means senses a coincidence between portions of the incoming and delayed pulses; and means to conduct a residue pulse from said coincidence means directly to the succeeding classifier stage.

2. A pulse duration classifier comprising:
(A) a plurality of serially connected threshold circuits, each threshold circuit including:
(1) a delay line, connected to receive the input signal being supplied to the threshold circuit;
(2) an AND gate connected to receive the input signal being supplied to the threshold circuit and the signal from the delay line whereby the threshold circuit blocks those input pulses whose duration is less than a predetermined minimum amount;
(B) an individual regenerative broadening circuit for each threshold circuit, said broadening circuit including:
(1) means to produce an inhibit pulse commencing with the receipt of signals from the AND gate and the delay line in the corresponding threshold circuit;
(2) means to terminate an inhibit pulse simultaneously with the termination of a delay pulse in the corresponding threshold circuit; and
(C) an individual inhibit get for each threshold circuit, said gate being connected to receive a signal from the corresponding delay line and an inhibit signal from the corresponding regenerative broadening circuit whereby an output pulse is derived from the inhibit gate only when the associated threshold circuit blocks the input pulse signal flow.

3. A device for measuring electrical pulse duration comprising:
(A) a bank of nine pulse duration classifier stages for each decimal order of magnitude desired in the measurement,
(B) each classifier stage including:
(1) means to delay an incoming pulse,
(2) coincidence detection means to produce a residue pulse throughout a period of coincidence between any portion of the incoming and the delayed pulses,
(3) an output signal terminal,
(4) means to pass the delayed pulse to the output terminal unless the detection means senses a coincidence between portions of the incoming and the delayed pulses, and
(5) means to pass a residue pulse to the succeeding classifier stage in the same bank whereby this succeeding stage is energized by a pulse having a duration equal to any excess of the incoming pulse duration over the delay time,
(C) means to indicate which output terminal has been energized during a measurement, and
(D) an OR gate connected to receive pulses from all except the first of the output terminals of the classifier stages in a given bank, said OR gate further having its output connected to pass signals to the delay line in the first classifier stage of the succeeding bank,
(E) said delay lines in a given bank each being adjusted to provide a delay equal to one-tenth the delay provided in the previous bank.

4. A pulse duration classifier comprising:
(A) a classifier input terminal,
(B) a plurality of classifier stages, each stage including:
(1) an output terminal,
(2) a threshold circuit to pass only those pulses exceeding a predetermined pulse duration,
(3) a delay line in said threshold circuit connected to receive the input signals to the classifier stage,
(4) an AND gate in said threshold circuit connected to receive the input signals to the classifier stage and the output signals from the delay line,
(5) a regenerative broadening circuit connected to receive signals from said AND gate and signals from said delay line,
(6) an inhibit gate to pass signals from the output of said delay line to said output terminal, said inhibit gate being further connected to receive inhibit signals from said regenerative broadening circuit,
(C) said threshold circuits in the various stages being connected in series relationship with the classifier input terminal so that only those pulses passing through a given stage reach the succeeding stage.

References Cited

UNITED STATES PATENTS

| | | | |
|---|---|---|---|
| 2,947,945 | 8/1960 | Relis et al. | 328—112 |
| 2,951,988 | 9/1960 | Harlan et al. | 328—112 |
| 3,036,272 | 5/1962 | LeVezu | 328—112 |

OTHER REFERENCES

"Delay Line Operated in Two Modes" Article in I.B.M. Technical Disclosure Bulletin, vol. 6, No. 1, p. 81 (June 1963).

RUDOLPH V. ROLINEC, *Primary Examiner.*

WALTER L. CARLSON, *Examiner.*

P. F. WILLE, *Assistant Examiner.*